(12) United States Patent
Stratton et al.

(10) Patent No.: US 6,408,676 B1
(45) Date of Patent: Jun. 25, 2002

(54) METHOD AND APPARATUS FOR DETERMINING THE STATUS OF A RELIEF VALVE

(75) Inventors: Kenneth L. Stratton, Dunlap; Steven R. Genseal; Steven R. Krause, both of Chillicothe; Patrick M. Pecchio; Richard J. Skiba, both of Peoria, all of IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/282,381

(22) Filed: Mar. 31, 1999

(51) Int. Cl.$^7$ ............................................. G01M 19/00
(52) U.S. Cl. ......................................................... 73/1.72
(58) Field of Search .......................................... 73/1.72

(56) References Cited

U.S. PATENT DOCUMENTS

| | | | | |
|---|---|---|---|---|
| 3,768,299 A | * | 10/1973 | Garren | 73/1.72 |
| 4,527,415 A | * | 7/1985 | Chabat-Courrede | 73/1.72 |
| 4,761,999 A | * | 8/1988 | Thompson | 73/1.72 |
| 4,893,494 A | * | 1/1990 | Hart | 73/1.72 |
| 4,986,075 A | | 1/1991 | Shimoie | 60/468 |
| 5,077,974 A | | 1/1992 | Kamikawa et al. | 60/452 |
| 5,136,846 A | | 8/1992 | Arii et al. | 60/468 |
| 5,638,748 A | | 6/1997 | Daniel | 100/53 |
| 5,848,531 A | | 12/1998 | Nakamura et al. | 60/426 |
| 5,855,159 A | | 1/1999 | Yoshida et al. | 91/451 |
| 6,039,326 A | * | 3/2000 | Agner | |

* cited by examiner

Primary Examiner—Robert Raevis
(74) Attorney, Agent, or Firm—W. Bryan McPherson

(57) ABSTRACT

The present invention provides an apparatus and method for determining a status of a relief valve located within a fluid system having a pump and an actuator valve. The fluid system 102 is located on an earth moving machine, and the pump delivers fluid to the actuator 110, 112 through the actuator valve 108. The system 102 includes a pressure compensation assembly 130 adapted to control the fluid pressure of the system by bypassing fluid flow. The system 102 also includes a relief valve, and a pressure sensor. The method includes the steps of positioning the actuator valve in a closed position, deactivating the pressure compensation assembly, and sensing a relief pressure of the system.

20 Claims, 5 Drawing Sheets

Fig-4a-
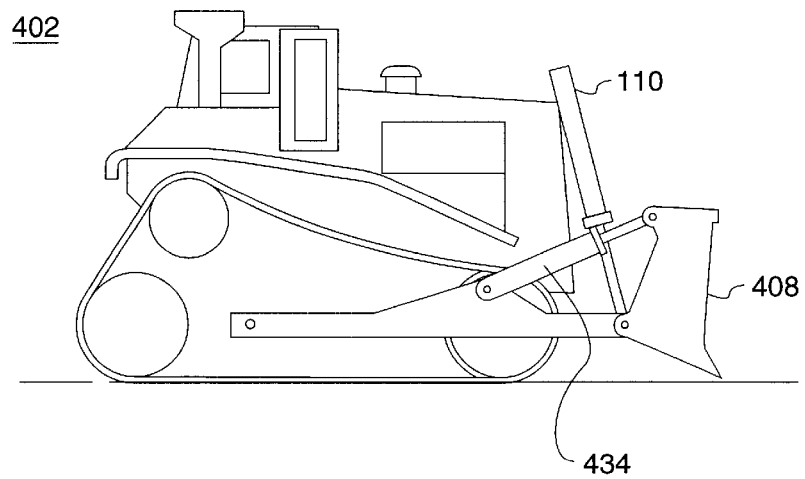
Fig-4b-
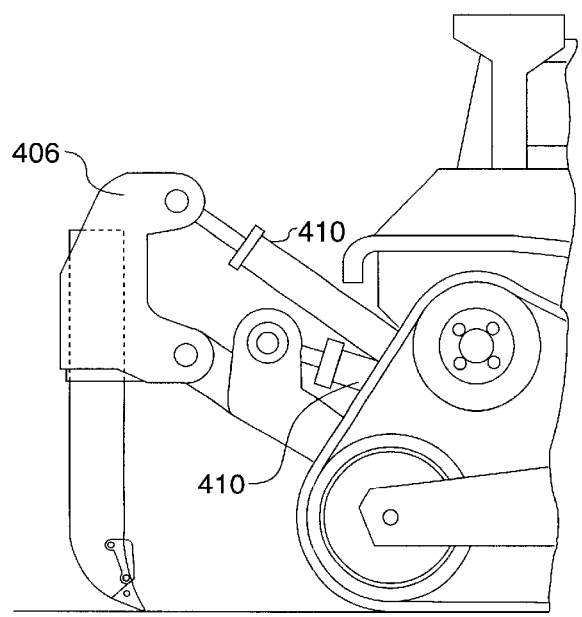

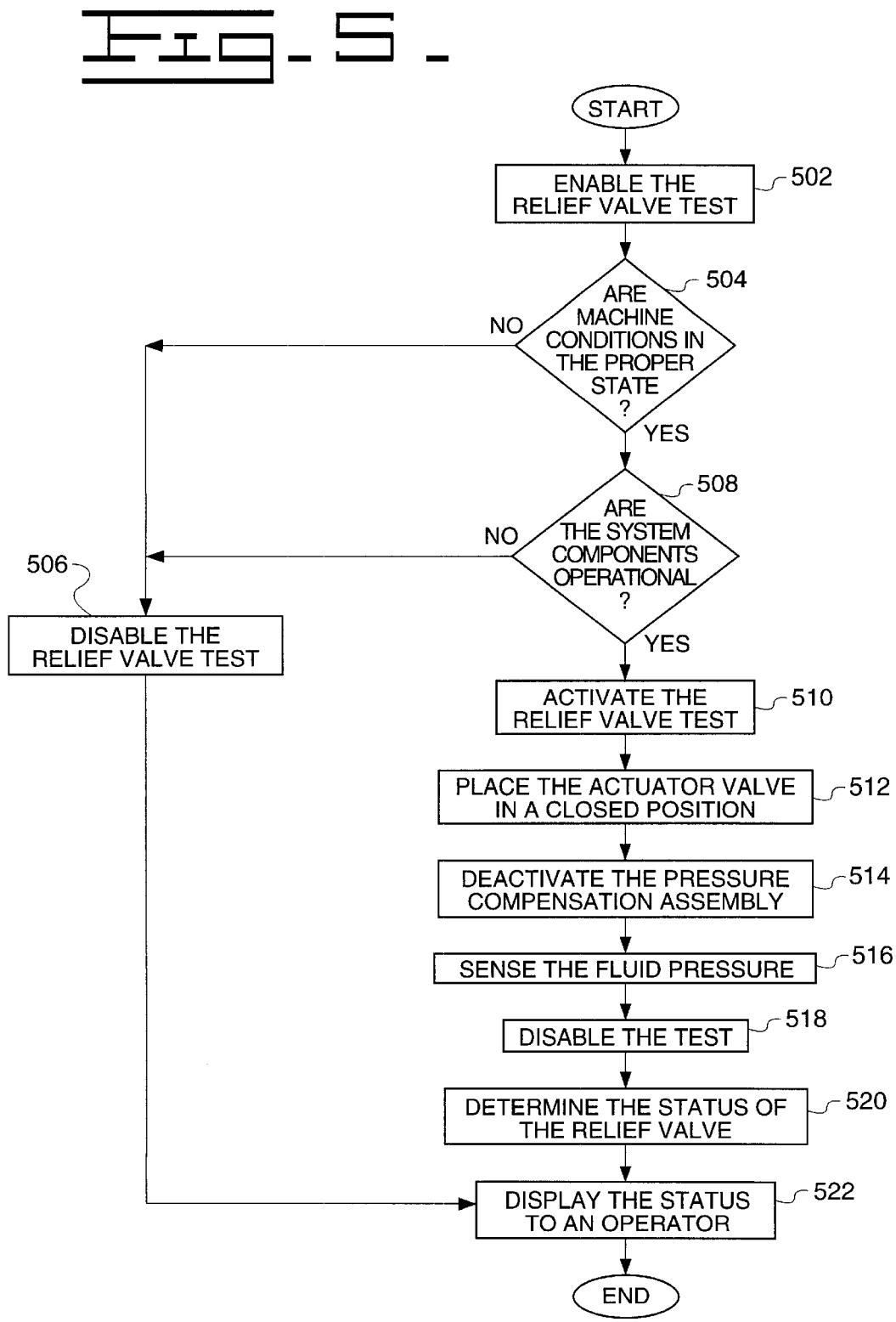

METHOD AND APPARATUS FOR DETERMINING THE STATUS OF A RELIEF VALVE

TECHNICAL FIELD

This invention relates generally to a fluid system, and more particularly, to a method and apparatus for determining the status of a relief valve associated with the hydraulic system.

BACKGROUND ART

Over a period of time, the relief valve located in a hydraulic circuit on an earthmoving machine needs to be calibrated. Calibration is necessary to ensure that the pressure within a circuit does not exceed a maximum pressure. If the actual pressure does exceed a maximum pressure then the hydraulic circuit, such as the cylinders, pumps and work implements, may be damaged. On many earthmoving machines that use hydraulic systems to power the implement system, it is difficult for mechanics to check the relief pressure setting of the hydraulic circuit. Preferably the status of the pressure relief valve is checked without moving any work implements. In a service area, for example, the implements may not be able to be moved because of space constraints, or possible damage from operating in a confined area. In many cases the only way to check the hydraulic circuit relief pressure is to disconnect one or more hydraulic hoses and insert specially designed gauges to determine the status of the relief valve. This is a time consuming task and since the hydraulic system has to be opened up, often in a dusty environment, it frequently causes contamination in the hydraulic system.

The present invention is directed to overcoming one or more of the problems identified above.

DISCLOSURE OF THE INVENTION

A method for determining a status of a relief valve located within a fluid system is disclosed. The method includes the steps positioning an actuator valve in a closed position, deactivating a pressure compensation assembly; thereby deactivating the bypass flow; and sensing a relief pressure of the system.

In yet another aspect of the present invention, an apparatus adapted to determine a status of a relief valve located within a fluid system is disclosed. The fluid system includes a pump and an actuator valve, and is located on an earth moving machine. The apparatus includes a pressure compensation assembly adapted to receive a pressure compensation command and responsively control the fluid pressure of the system; a pressure sensor adapted to sense the pressure of the fluid within the circuit and responsively generate a pressure signal; and a controller adapted to receive the pressure signal, deliver an actuator valve command to the actuator valve thereby placing the actuator valve in a closed position, deliver said pressure compensation command to said pressure compensation assembly, thereby placing the assembly in a deactivated position, and determine a pressure of said fluid in response to said pressure signal.

BRIEF DESCRIPTION OF THE DRAWINGS

FIG. 4A is a high level diagram of an earth moving machine;

FIG. 4B is a high level diagram of an alternative embodiment of earth moving machine; and FIG. 5 is an illustration of one embodiment of a method for determining a status of a relief valve.

BEST MODE FOR CARRYING OUT THE INVENTION

Figure 1:
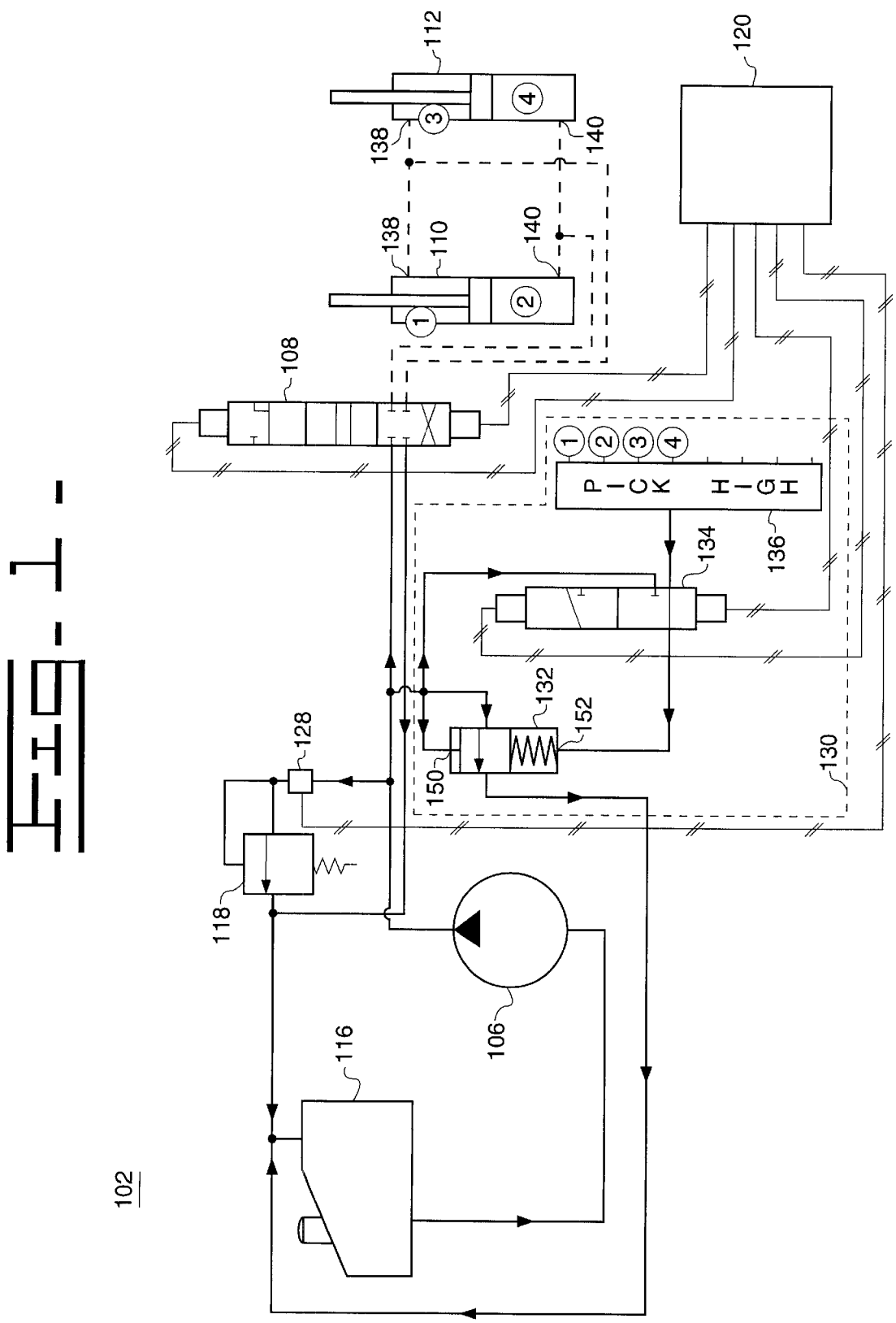
FIG. 1 is a high level diagram of one embodiment of an fluid system.
Figure 2:
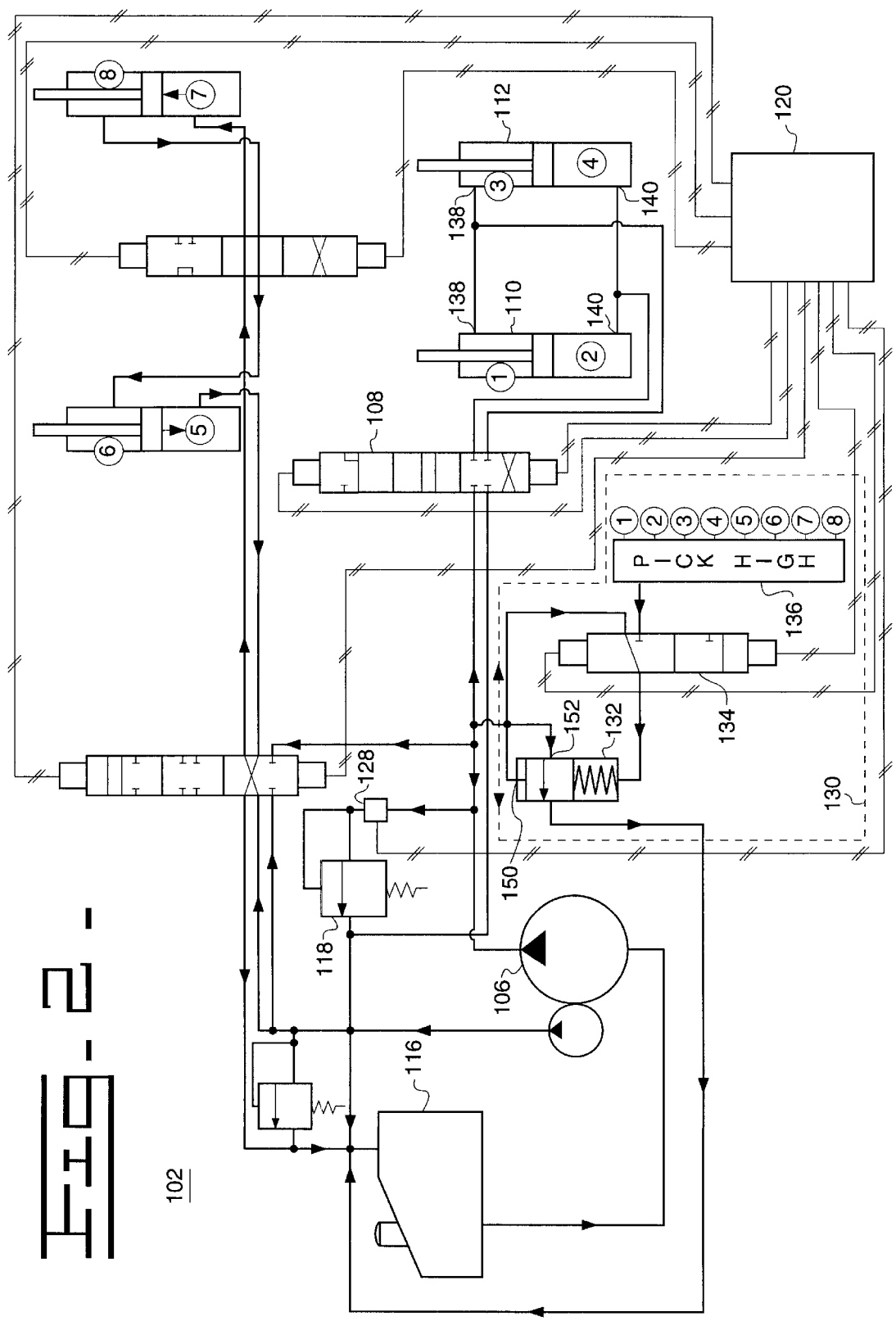
FIG. 2 is a high level diagram of an alternative embodiment of a fluid system.

The present invention provides an apparatus and method for determining a status of a relief valve located within a fluid system. FIG. 1 is an illustration of one embodiment of a fluid system, shown as a hydraulic system 102. The hydraulic system 102 includes a pump engine (not shown) driving a pump 106. The pump 106 delivers actuating fluid to the system 102. In particular the pump 106 delivers fluid to a first and second fluid actuator 110, 112 via an actuator valve 108. In the preferred embodiment the first and second actuators 110, 112 are cylinders. Only two fluid actuators 110, 112 and one actuator valve 108 are illustrated in FIG. 1, however, additional cylinders and valves may be connected to the fluid system 102, as illustrated in FIG. 2. The actuator valve 108 controls fluid flow to the actuators 110, 112. The fluid flows through the valve 108, and returns to a fluid sump 116, or tank. The tank 116 is also attached to the pump 106. The system 102 includes a relief valve 118 connected between the pump 106 and the tank 116. In addition, the system 102 includes a pressure compensation assembly 130 adapted to control the fluid pressure of the system 102 by bypassing fluid flow. In the preferred embodiment, the pressure compensation assembly 130 includes a pressure compensation valve 132, a pressure compensation override (PCO) valve 134, and a resolver 136.

In one embodiment, a fluid temperature sensor (not shown) may be included in the system 102. The fluid temperature sensor senses the temperature of the actuating fluid and responsively generates a temperature signal.

In one embodiment, a fluid temperature sensor (not shown) may be included in the system 102. The fluid temperature sensor 120 senses the temperature of the actuating fluid and responsively generates a temperature signal.

The circuit 102 includes an electronic control module (ECM), or controller, 120. The controller 120 is electrically connected to the actuator valve 108, the PCO valve 134, and a pressure sensor 128. The controller 120 receives operator inputs and responsively delivers command signals to the valves 108, 134 in order to control the position of the valves 108, 134 thereby controlling the amount of fluid that flows to the actuators 110, 112. Therefore, the position of the actuator 110 may be controlled by the controller 120. The operator inputs may be generated by on on board operator, remotely located operator, or an autonomous vehicle program. The sensor inputs received by the controller 120 may include a fluid temperature signal, and a fluid pressure signal. In response to the sensor inputs, a software program executing within the controller 120 may determine the status of the relief valve 118.

FIG. 1 illustrates the PC valve 132 located in an active position, and the PCO valve 134 is located in an inactive position. The resolver 136, is hydraulically connected to different points of the hydraulic system 102. In one embodiment, the resolver 136 receives fluid inputs from the head 138 and rod 140 end of each actuator 110, 112 respectively. The resolver 136 then enables the highest pressure fluid to flow to the PCO valve 134. The pressure compensation valve 132 has a test fluid input 150 and a fluid bias input 152. The highest pressure fluid is delivered through the PCO valve 134, in an active position, to the bias input 152 of the pressure compensation valve 132. The fluid bias input is added to a bias factor, e.g., 120 psi, resulting in a biasing force that is used to control the fluid flow from the pump 106 to the tank 116 via the pressure compensation valve 132. When the fluid pressure from the pump 106 is larger than the fluid bias force the pressure compensation valve 132 is opened, and the fluid flows to tank 116.

Figure 3:
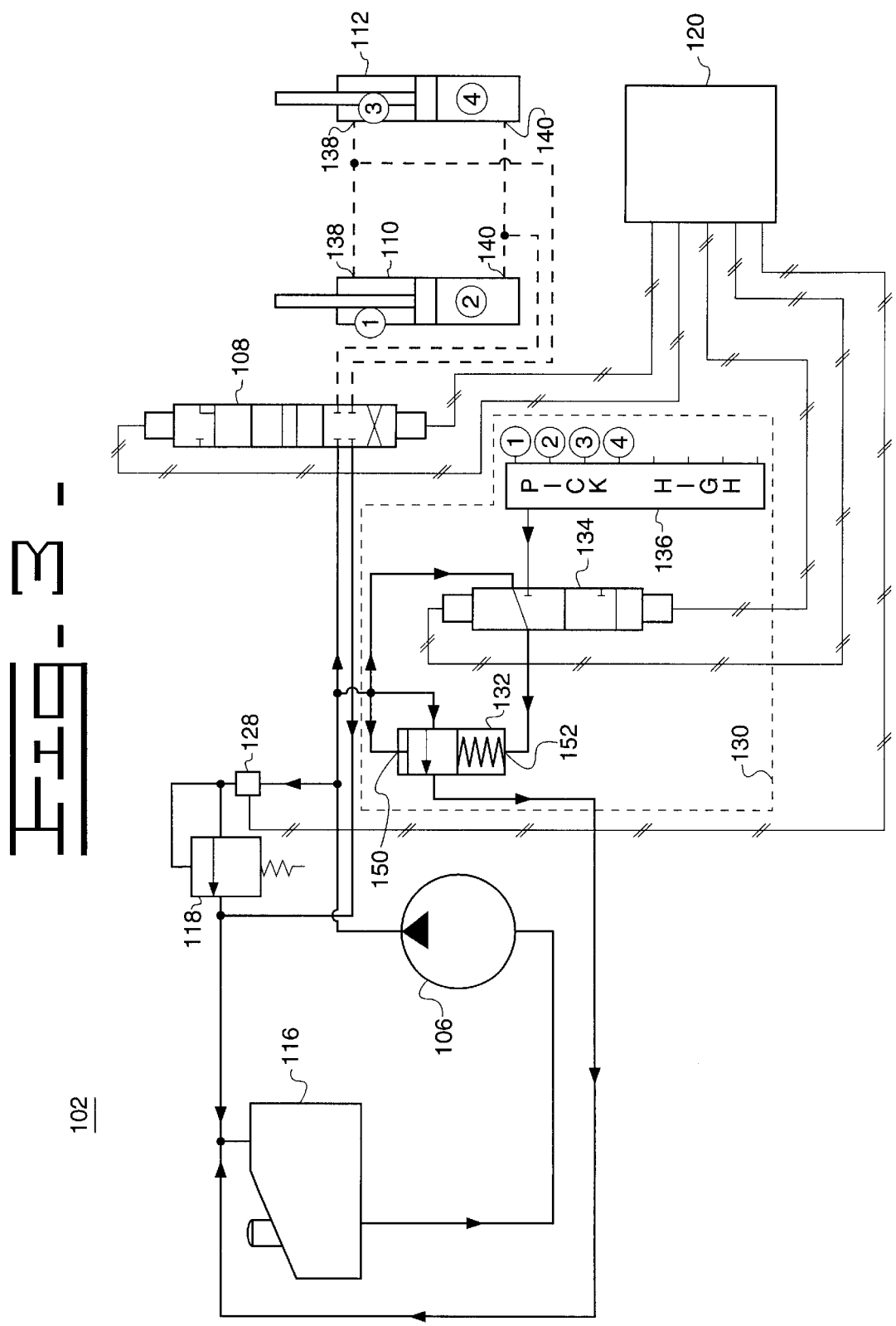
FIG. 3 is a high level diagram of one embodiment of a fluid system.

FIG. 3 illustrates the case where the PCO valve 134 is in an active position. The PCO valve 134 is controlled in response to a command signal from the controller 120. When the PCO valve 134 is commanded to an active position, i.e., the valve 134 position is shifted from a first to a second position, the fluid from the pump 106 flows through the PCO valve 134, and is applied to the bias input 152 of the pressure compensation valve 132. Now, the bias force is the main pump pressure plus the bias constant. The main pump pressure is also applied to the test fluid input 150. The main pump pressure is no longer able to overcome the bias force, because the bias force is inherently 120 psi, for example, larger than the main pump fluid pressure. Therefore, the pressure compensation valve 132 is not opened, or activated, and the fluid from the main pump is not able to flow through the pressure compensation valve 132, back to tank 116.

When the PCO valve 134 is in an active position, and the actuator valve 108 is closed, or in a neutral position, then fluid pressure begins to build in the system 102. The fluid pressure eventually reaches a level activating the relief valve 118. For example, if the relief valve 118 is calibrated to open at 3500 psi, when the fluid pressure in the system 102 reaches 3500 psi, the relief valve 118 is activated, and the fluid is able to flow to tank 116. The fluid pressure will then remain at 3500 psi unless the conditions of the hydraulic system 102 change, such as, the actuator 108 is moved, or the PCO valve 134 is deactivated.

In the preferred embodiment the hydraulic system 102 is located on an earthmoving machine 402, such as a track type tractor, which is illustrated in FIG. 4A. The earthmoving machine 402 includes a work implement 408 controllably attached to at least one lift cylinder 110, and at least one angle cylinder 434. FIG. 4B illustrates a track type tractor 402 with a ripper attachment 406 connected to at least one ripper cylinder 410.

FIG. 5 illustrates a flow diagram of one embodiment of the method of the present invention. The method determines the status of the relief valve 118 within the hydraulic system 102. In a first control block 502 the relief valve test, or calibration, is enabled to determine a status of the relief valve 116. The test, or calibration, may be enabled either manually by an operator input or in an automated manner by an program, such as a calibration program or diagnostic program. An operator input may be provided through a joystick (not shown) or a key pad (not shown). In a first decision block 504 a determination is made as to whether the machine operating conditions are in the proper state. For example, the engine speed may be monitored, via the input from a speed sensor (not shown), to determine if the engine is running at high idle, or normal operating speed, e.g., 1800 rpm. The parking brake (not shown) may be monitored to determine if the parking brake is set. The implements may be checked to ensure that they are not in a locked position because the system 102 needs to provide pilot pressure to the PCO valve 134. However, in one embodiment, it is desirable to ensure the implements do not move during the test, therefore, the position of the actuator valve 108 is commanded to a closed or neutral position. In the preferred embodiment, the engine 104 is running, the parking brake is set to ensure the machine does not move during the test, and the implements are not in a locked position. The temperature of the hydraulic fluid may be monitored to determine if the fluid is at an appropriate temperature. For example if the fluid temperature is greater than 100 degrees Celsius, the fluid may be considered to hot to perform the test, because excessive temperature may cause damage to components within the system 102. If any of the machine conditions are not in the proper state, control passes to a second control block 506 where the test is disabled, and the machine conditions may be displayed to an operator. For example, if the test was disabled because the parking brake was not set, then that would be displayed to the operator. In an alternative embodiment, any machine conditions that are not in the proper state may be displayed to an operator to provide the operator the opportunity to correct them. If the machine conditions are not corrected then control may pass to the second control block 506 to display the results and end the test.

If the machine conditions are in the proper state then control may pass to a second decision block 508 to check the status of the components associated with the hydraulic system 102. For example, if there is a problem with an actuator valve 108, the pressure compensation assembly 130, or the relief valve 118, then the test may be disabled to ensure that further damage does not occur to the components within the system 102. Therefore, if a failure has been detected regarding the circuit components, such as the valves, solenoids, pump, actuator(s) or work implement(s) then control passes to the second control block 506, the test may be disabled, and the failure displayed to the operator. If no component diagnostic has occurred that may effect the relief valve test, then control proceeds to a third control block 510.

In a third control block 510 the relief valve test is activated. In one embodiment, the operator activates the relief valve test by providing an operator input to a keypad, or joystick. For example, once the test is enabled, the normal joystick functions are disabled. Then, the joystick may be used to activate the test. The test may be activated when the joystick is moved beyond a seventy percent deflection from the neutral position, for example.

In a fourth control block 512 the position of the actuator valve 108 is commanded to a closed position. In a fifth control block 514, the pressure compensation assembly 130 is deactivated. In the preferred embodiment, the PCO valve 134 is activated, thereby preventing the pressure compensation valve 132 from opening. Therefore, the pump fluid may not flow to tank 116, as described above. That is, the bypass flow from the pump 106 to the tank 116 is deactivated. With the pressure compensation assembly 130 deactivated, and the actuator valve 108 closed, the fluid pressure in the system 102 will rise until the relief pressure of the relief valve 118 is achieved, at which time the relief valve 118 is activated. When the relief valve 118 is activated, the valve 118 opens, enabling fluid from the pump 106 to flow to the tank 116.

In a sixth control block 516 the pressure of the hydraulic system 102 is monitored to determine the relief pressure. The relief pressure is the pressure the system 102 builds up to when the relief valve 118 is activated, e.g., 3500 psi. One of the objectives of the present invention is to determine what pressure will cause the relief valve 118 to activate.

Therefore, when the relief valve 118 is activated, the pressure is sensed to determine what the relief pressure of the system 102 is. Once an accurate reading of the relief pressure has been obtain, the test may be disabled. In the preferred embodiment, the relief pressure is stored in memory.

In a seventh control block 518 the test is disabled. There are several ways to disable the test. In one embodiment, the test is disabled after a predetermined amount of time. For example, after eight seconds, the test may be disabled to ensure that no harm comes to the hydraulic system 102. If a diagnostic related to the hydraulic system 102, e.g., valve, solenoid, or implement failure, then the test may be automatically disabled to ensure that no harm comes to the system. In another embodiment, the test may be disabled by the operator prior to the end test time, i.e., eight seconds. In one embodiment using the joystick control to activate the test, the operator may disable the test by decreasing the joystick position to less than a seventy percent deflection from the neutral position. When the test is disabled, the operator is prompted to verify the test is complete. Once the operator acknowledges that test is complete, e.g., via a keypad input, the joystick control returns to its normal function, e.g., implement control.

In an eighth control block 520, the status of the relief valve 118 is determined. In one embodiment, the status is either calibrated or uncalibrated. In the preferred embodiment, the sensed, or actual, relief pressure is compared to an desired relief pressure. If the sensed relief pressure is not within a predetermined threshold of the expected relief pressure, then the relief valve 118 needs to be calibrated, i.e., adjusted so that the relief valve 118 activates at the desired pressure. Therefore, if the sensed relief pressure is not within a threshold of the desired relief pressure then the status of the relief valve 118 may be considered to be uncalibrated. Otherwise the status of relief valve may be determined to be calibrated.

In one embodiment, the result of the test may be displayed to the operator, either on board or off board the machine. For example, in a ninth control block 522, a display message may indicate that the relief valve 118 needs to be calibrated, and then provide the expected and sensed relief pressures.

If the relief valve is uncalibrated, the operator, or a service mechanic may then re-calibrate the relief valve to activate at the desired relief pressure.

INDUSTRIAL APPLICABILITY

The present invention provides a method for determining a status of a relief valve located within a fluid system having a pump and an actuator valve. The fluid system 102 is located on an earth moving machine, and the pump delivers fluid to the actuator 110, 112 through the actuator valve 108. The system 102 includes a pressure compensation assembly 130 adapted to control the fluid pressure of the system by bypassing fluid flow. The system 102 also includes a relief valve, and a pressure sensor. The method includes the steps of positioning the actuator valve in a closed position, deactivating the pressure compensation assembly, thereby deactivating the bypass flow, and sensing a relief pressure of the system.

The operator, either on board or off board, may determine to run a relief valve test. The test may be initiated by selecting the relief valve test option from a menu option on the display. When the test is initiated, the machine conditions and the status of the hydraulic circuit components are checked to determine that the they are in the proper state for the test to be performed.

The relief pressure test may be run a period of time less then a predetermined maximum time threshold. If the system 102 does not reach the relief pressure within the maximum time threshold then the test is disabled. The purpose of the threshold is to ensure that the system 102 components are not damaged during the test.

Once the test has been concluded the sensed relief pressure is compared to an expected relief pressure to determine the status of the relief valve 118. If the sensed relief pressure is within a predetermined threshold (e.g., +/−5%) of the desired relief pressure, then the status of the relief valve may be determined to be calibrated. If the actual relief pressure is outside the range, the relief valve status may be determined to be uncalibrated. The results of the test may then be reported to the operator.

Other aspects, objects and advantages of the present invention can be obtained from a study of the drawings, the disclosure and the appended claims.

What is claimed is:

1. A method for determining a status of a relief valve located within a fluid system having a pump and an actuator valve, the fluid system being located on an earth moving machine, the pump delivering fluid to an actuator through the actuator valve, the system including a pressure compensation assembly adapted to control the fluid pressure of the system by bypassing fluid flow, and a pressure sensor, comprising the steps of:

positioning the actuator valve in a closed position;

deactivating the pressure compensation assembly; thereby deactivating the bypass flow; and sensing a relief pressure of the system.

2. A method, as set forth in claim 1, including the step of activating the relief valve in response to said deactivation of the pressure compensation assembly.

3. A method, as set forth in claim 2, including the step of determining a status of the relief valve in response to said relief pressure.

4. A method, as set forth in claim 3, including the step of comparing said sensed relief pressure to a desired relief pressure.

5. A method, as set forth in claim 4, wherein said relief valve status includes one of calibrated and uncalibrated.

6. A method, as set forth in claim 5, including the steps of:

comparing said relief pressure with a desired relief pressure, and determining said relief valve is calibrated in response to said relief pressure being within a threshold of said desired relief pressure.

7. A method, as set forth in claim 6, wherein the pressure compensation assembly includes a pressure compensation valve having a fluid test input, a fluid bias input, and a fluid output, wherein the step of deactivating the pressure compensation assembly includes the step of applying a main pump fluid pressure to the bias fluid input of the pressure compensation valve, and the main pump fluid pressure to the fluid test input.

8. A method, as set forth in claim 7, wherein the step of deactivating the pressure compensation assembly includes the step of activating the pressure compensation override valve in a manner to enable the main pump pressure fluid to be delivered to the bias fluid input of the pressure compensation valve.

9. A method, as set forth in claim 8, wherein the relief valve status determination is enabled in response to one of an operator input and an automated calibration procedure.

10. A method, as set forth in claim 9, including the steps of:

sensing an diagnostic associated with said fluid system; and disabling said relief valve status determination in response to said sensed diagnostic.

11. A method, as set forth in claim 10, wherein said fluid is a hydraulic oil, including the steps of:

sensing a temperature of said oil; and disabling said relief valve status determination in response to said oil temperature being less than a predetermined threshold.

12. A method, as set forth in claim 11, including the step of disabling said relief valve status determination after a predetermined amount of time.

13. A method, as set forth in claim 12, including the step of displaying said relief pressure to an operator of said machine.

14. A method, as set forth in claim 13, including the step of calibrating the relief valve in response to said relief valve status.

15. An apparatus adapted to determine a status of a relief valve located within a fluid system having a pump and an actuator valve, the fluid system being located on an earth moving machine, the pump delivering fluid to an actuator through the actuator valve comprising:

a pressure compensation assembly adapted to receive a pressure compensation command and responsively control the fluid pressure of the system, said assembly connecting the pump to a tank;

a pressure sensor adapted to sense the pressure of the fluid within the circuit and responsively generate a pressure signal; and a controller adapted to receive said pressure signal, deliver an actuator valve command to the actuator valve thereby placing the actuator valve in a closed position, deliver said pressure compensation command to said pressure compensation assembly, said command placing the assembly in a deactivated position, determining a pressure of said fluid in response to said pressure signal and said deactivated pressure compensation assembly, and determining a status of the relief valve in response to said fluid pressure.

16. An apparatus, as set forth in claim 15, wherein said pressure compensation assembly includes:

a pressure compensation valve having a fluid test input, a fluid bias input, and a fluid output; and a pressure compensation override valve adapted to receive said pressure compensation command and responsively deliver one of a main pump flow and a load pressure to said fluid bias input.

17. An apparatus, as set forth in claim 16, wherein said controller is further adapted to compare said sensed relief pressure to a desired relief pressure and responsively determine the relief valve status is one of a calibrated and an uncalibrated.

18. An apparatus, as set forth in claim 17, wherein said controller is adapted to receive an operator input signal, and enable said relief valve status determination in response to said input signal.

19. An apparatus, as set forth in claim 18, wherein said controller is adapted to detect a machine condition and disable said relief valve test in response to said condition.

20. An apparatus, as set forth in claim 19, including:

a display adapted to receive a relieve valve status signal from said controller and display said relief valve status.

* * * * *